Nov. 10, 1964
C. S. BROWN
3,156,033
METHOD AND APPARATUS FOR FORMING A GLASS
COATED TUBULAR ROLLER ELEMENT
Filed Jan. 2, 1962
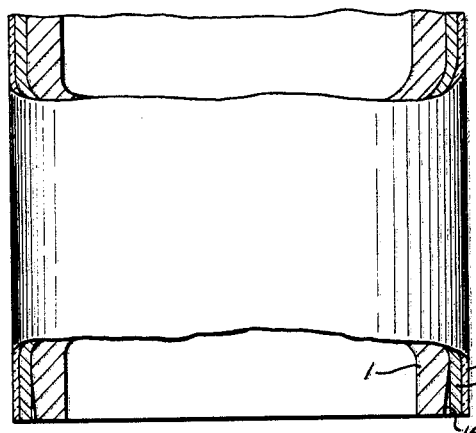
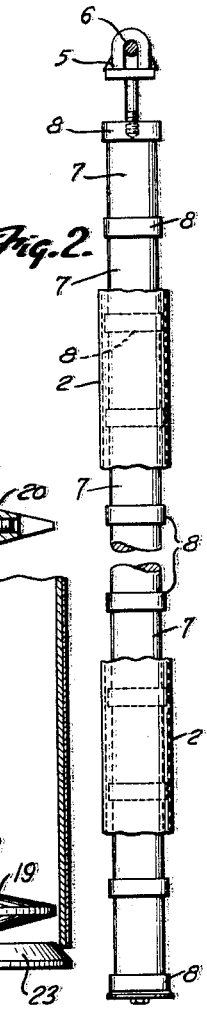
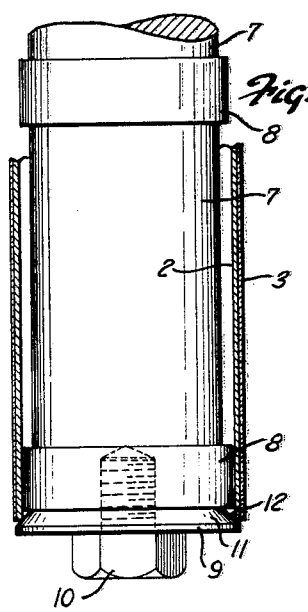
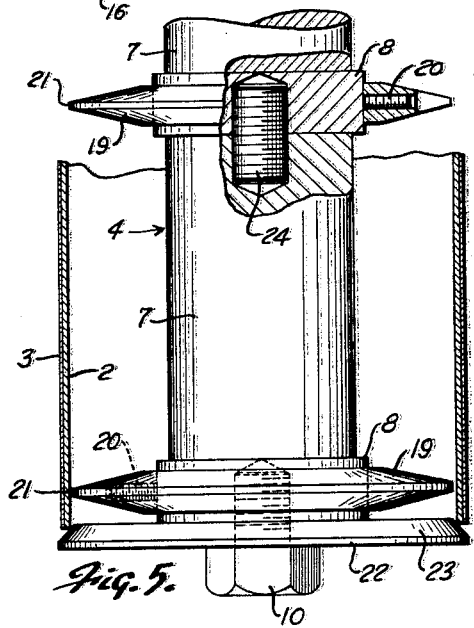
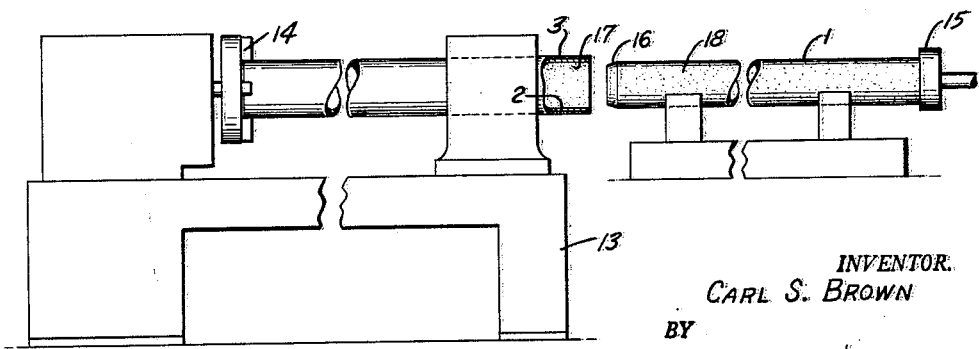
INVENTOR.
CARL S. BROWN
BY
Andrus & Starke
ATTORNEYS United States Patent Office 3,156,033
Patented Nov. 10, 1964

1

3,156,033
METHOD AND APPARATUS FOR FORMING A GLASS COATED TUBULAR ROLLER ELEMENT
Carl S. Brown, Cleveland, Ohio, assignor to A. O. Smith Corporation, Milwaukee, Wis., a corporation of New York
Filed Jan. 2, 1962, Ser. No. 163,641
6 Claims. (Cl. 29—148.4)

This invention relates to a glass coated tubular member and particularly to an improved method and apparatus for forming a furnace-fired or fused glass-coated tubular member.

Tubular members have been internally and externally glass coated by applying a suitable glass frit to the surface to be coated and then supporting the member in a firing furnace to increase the temperature or to fuse the glass frit to the member. However, in fusing of the glass to the tubular member, generally a substantial amount of furnace distortion or warping results. In certain applications, the degree of warpage must be highly minimized in order to provide a satisfactory use of the glass-coated roll.

This invention is particularly directed to a method and apparatus for glass coating the outer surface of a tubular member while maintaining or substantially minimizing the furnace warpage effect. As employed herein, glass is generally synonomous with vitreous enamel and the like. The present invention is particularly directed to the provision and method of forming an insulating roll for use in processing of cellophane film.

Cellophane film will not generally accept or retain printing unless the surface is oxidized. Conventionally, the cellophane surface is subjected to high voltage discharge which oxidizes the surface slightly. In practice, the discharge takes place as the cellophane passes over a roller having an insulating outer coating and under the discharge bar of a high voltage source. Commercially glass of a proper thickness to withstand 20,000 volts is the most practical insulating coating for the outer surface of the roller. All other coatings which have been suggested have been found to separate from the roller.

As previously noted, glass coating of rollers in a furnace or the like results in a substantial distortion and generally is so severe as to make the device unsuitable for such applications. The present invention is directed to a method and apparatus for minimizing the furnace warpage to a level which permits the production of the conventional high discharge roll for cellophane processing or the like.

Generally, the present invention employs a laminar roller having a thin outer shell to which the glass coating is applied and an inner supporting and distortion eliminating core.

In accordance with the present invention the relatively thin-wall tubular shell is covered with a suitable glass frit or the like and supported in a vertical position within a furnace on a special alloy rack. Generally, the rack member includes a plurality of axially spaced spacer rings of a slightly smaller diameter than the internal diameter of the shell such that the tube can be rotated on the alloy rack.

After a fused glass coating is built up on the shell to the desired thickness, the assembly is removed from the furnace and a relatively heavy wall tubular liner or core is forced into the thin-wall shell and forces the latter out to a substantially true round form. Generally, it has been found desirable to provide a lubricating material on both the internal surface of the tubular shell and the exterior surface of the core.

Applicant has found that the glass follows the outward movement of the tubular shell without separation of glass from the shell if the yield point of the steel is not exceeded. It appears that the assembly takes advantage of the limited flexibility of the glass to adjust itself to the pressure exerted by the inner core as it is forced through the outer tubular wall.

The present invention thus provides a method and apparatus for providing a glass coated tubular member with substantial elimination of the warpage caused during the fusion of the glass coating to the surface of the tubular member.

The drawings furnished herewith illustrate the best mode presently contemplated for carrying out the invention.

In the drawings:

FIG. 1 is a fragmentary view of a finished tubular roll or member;

FIG. 2 is an elevational view of a tubular roll secured to a hanger within a furnace for fusing of a glass coating thereto;

FIG. 3 is an enlarged fragmentary view of FIG. 2;

FIG. 4 is an elevational view illustrating the forcing of an inner core into a glass coated tubular shell with parts broken away to diagrammatically illustrate the lubrication of the parts; and FIG. 5 is a fragmentary view similar to FIG. 3 illustrating the invention applied to the glass coating of a somewhat larger diameter tubular shell.

Referring to the drawings and particularly to FIG. 1, a glass coated tubular roller constructed in accordance with the present invention is illustrated and includes an inner tubular core 1 of a relatively substantial thickness and an outer thin-wall tubular shell 2 telescoped with the inner core 1. Whereas the inner core 1 is generally a heavy self-supporting member, the thin-wall shell 2 is a substantially non-self-supporting member. As applied to an insulating discharge roller for cellophane processing, the wall thickness of the outer shell may be about .0005 inch and the core about one inch.

A glass coating 3 is fused to the outer exterior surface of the thin-wall shell 2 to provide an insulating surface over which the cellophane film, not shown, is passed.

Referring to FIGS. 2 and 3, the tubular shell 2 is mounted for glass coating as follows.

A cylindrical rack 4 of a somewhat greater length than the shell 2 includes a top hanger 5 by which the rack is secured to a suitable hook or rod support 6 and supported within a suitable furnace or the like, not shown. The thin-wall shell 2 is carried by the rack 4 in a position for fusing of a glass frit or the like thereto.

The rack 4 includes a series of alternate supporting shafts 7 and locating or spacer rings 8 which are interconnected in axial end-to-end relation as by butt welding or the like. Shafts 7 and rings 8 are solid and formed of a stainless steel alloy or the like which are not distorted by the temperature employed in firing the coating 3. The diameter of the spacer rings 8 is slightly greater than that of the shafts 7 and slightly less than the internal diameter of the thin-wall shell 2, as most clearly shown in FIG. 3. This clearance provides ease of assembly and disassembly of the shell 2 with respect to rack 7 even at elevated temperatures.

A supporting disc 9 is bolted as by a bolt 10 or otherwise secured to the lowermost spacer ring 8. The outer edge of the disc 9 is tapered as at 11 and extends or diverges radially outwardly of the adjacent ring 8 to present the tapered edge to the lower end of the thin-wall shell 2. The inner edge 12 of the thin-wall shell 2 rests on the tapered edge 11 and supports the shell 2 on the inner edge thereof during the fusing of the glass coating. Any glass which flows downwardly will not be collected on the disc as may occur with a straight ledge. This eliminates a possible cause of spalling or breaking away of the glass at the edge of shell 2.

After a sufficient thickness of glass has been fused to shell 2 to form the desired coating 3, the glass-coated tubular shell 2 is removed from the furnace and placed in an assembly machine 13 as shown in FIG. 4.

The illustrated machine 13 is generally a lathe type unit adapted to support the glass-coated shell 2 for axial alignment with the inner core 1. A stop 14 is secured abutting the one end of shell 2 with the opposite end adjacent core 1. A ram 15 is secured to core 1 and is moved axially to force core 1 into shell 2.

The core 1 is machined to an outer diameter slightly smaller than the inside diameter of shell 2 and preferably to provide a .0020 to .0025 inch clearance. The end of the core 1 immediately adjacent the end of the shell 2 is also provided with a slight taper 16 to center core 1 with shell 2 during the initial movement of the core into the shell 2.

Assembly is also desirably facilitated by applying to the mating surfaces of the core 1 and the shell 2 a suitable lubrication 17 and 18 of white lead in oil or any other suitable medium.

The core 1 is pressed into the shell 2 and forces the shell 2 to an essentially true cylindrical round exterior configuration.

The core 1 may be forced into the shell 2 with the shell either hot or cold.

Applicant has constructed 3½ inch diameter rollers in lengths up to 78 inches with the finished roller run-out well within the .060 inch tolerance which has been required as a minimum for cellophane processing applications and the like. Generally, the apparatus constructed had an internal diameter of 2.875 and a finished outer diameter tolerance lying between 3.580 and 3.620 inches. The glass-fired shells 2 employed had a run-out of as much as 0.120 inch. This was reduced after assembly with the machined inner core 1 to 0.040 inch and thus completely satisfactory for the highest commercial standard presently employed in the cellophane processing industry.

The present invention employs the restricted flexibility of the glass coating 3 to allow limited movement of the shell 2 and elimination of distortion.

Referring particularly to FIG. 5, a view similar to FIG. 2, the rack 4 is illustrated with an increased diameter shell 2 mounted in place for firing a glass coating thereto. Generally, corresponding elements in FIG. 5 and FIGS. 2 and 3 are similarly numbered for simplicity and clarity of explanation. Additional spacer rings 19 are concentrically secured to the spacer rings 8 by recessed and circumferentially spaced set screws 20 or the like. The edges of rings 19 are tapered to provide a small locating surface 21 adjacent the shell 2. Rings 19 are also formed to provide clearance between surfaces 21 and the shell 2.

An enlarged supporting disc 22 is secured to the bottom spacer ring 8 and includes a tapered edge 23 aligned with the lower end of the shell 2. The supplemental spacer rings 19 increase the flexibility for the firing fixtures while maintaining expense at a minimum.

To provide for shells 2 of varying length, the lowermost shafts 7 and rings 8 can be made as a subassembly and secured in place with a suitable stud 24 having threads corresponding to the bolt 10 as shown in FIG. 5.

The present invention thus provides a method and apparatus for manufacture of a glass coated roller having a minimum of run out.

Various modes of carrying out the invention are contemplated as being within the scope of the following claims particularly pointing out and distinctly claiming the subject matter which is regarded as the invention.

I claim:

1. A method of forming a glass-coated roller, comprising, (a) fusing a glass coating to the exterior surface of the thin-wall non-self-supporting tubular shell,
   (b) subsequently forcing a central self-supporting core having an outer continuous diameter substantially corresponding to the internal diameter of the shell into the thin-wall shell to substantially remove any distortion from the shell and form a self-supporting laminated roller.

2. A method of forming a glass-coated roller, comprising, (a) assembling a thin-wall tubular shell on an internal radially supporting rack,
   (b) fusing a glass coating to the exterior surface of the thin-wall tubular shell,
   (c) subsequently pressing a central self-supporting core having an essentially true cylindrical periphery and having an outer diameter substantially corresponding to the internal diameter of the shell into the thin-wall shell to substantially remove any distortion from the shell and form a self-supporting laminated roller.

3. The method of claim 2 wherein said supporting rack is generally a cylindrical unit extending at least coextensively of the shell and said shell is free to rotate on said supporting rack.

4. A rack for supporting a tubular shell while fusing a glass coating to the external surface, comprising, (a) similar alternate shafts and locating elements secured in end-to-end relation with an element at the lower end, said elements having a cylindrical periphery for supporting the shell during fusing of a glass coating and being slightly smaller than the internal diameter of a shell to facilitate assembly and disassembly of the shell with respect to the rack for firing of the glass coating, and
   (b) a supporting disc secured to the lowermost of said shafts at the lower end of the rack and having a tapered edge presented to the lower end of the shell for supporting the lower end of the shell on the assembly.

5. A method of forming a laminated glass coated roller element comprising, (a) fusing a glass coating to the exterior surface of a thin-wall, non-self-supporting tubular shell,
   (b) machining a core to an outer circumference related to the internal diameter of the shell to provide a clearance of approximately .002 to .0025 inch therebetween,
   (c) lubricating the core and the shell to facilitate movement of the core into the shell, and
   (d) forcing the tubular core into the shell to substantially remove any distortion of the shell and form a self-supporting laminated roller.

6. The method of claim 5 including the step of initially assembly the shell with a rack including a plurality of axially spaced spacer rings of a slightly smaller diameter than the internal diameter of the shell to facilitate assembly and disassembly of the shell with respect thereto during and subsequent to firing of the glass coating wherein said tubular shell is assembled with the rack and then a glass coating is fused thereto and the shell is disassembled from the rack prior to the forcing of the tubular core into the shell.

References Cited in the file of this patent

UNITED STATES PATENTS

| | | |
|---|---|---|
| 1,394,684 | Matsuo | Oct. 25, 1921 |
| 1,659,261 | Guillet | Feb. 14, 1928 |
| 2,411,024 | Bruun | Nov. 12, 1946 |
| 2,651,241 | Hornbostel | Sept. 8, 1953 |
| 2,704,884 | Ingels | Mar. 29, 1955 |
| 2,910,962 | Appleton | Nov. 3, 1959 |
| 2,983,990 | Stevenson et al. | May 16, 1961 |
| 2,988,803 | Mohn | June 20, 1961 |